United States Patent
Nelson

(10) Patent No.: US 7,182,043 B1
(45) Date of Patent: *Feb. 27, 2007

(54) ANIMAL GROOMING TOOL

(75) Inventor: Joshua D. Nelson, Pawlet, VT (US)

(73) Assignee: Miller Manufacturing Company, Eagan, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/006,476

(22) Filed: Dec. 6, 2004

(51) Int. Cl.
*A01K 13/00* (2006.01)

(52) U.S. Cl. .......................... 119/604; 401/285; 15/121

(58) Field of Classification Search .............. 119/604, 119/603, 613, 614, 617, 665; 401/139, 140, 401/130, 128, 261, 266, 265, 285; 15/103, 15/121, 320; 239/532
See application file for complete search history.

(56) References Cited

U.S. PATENT DOCUMENTS

| | | | | |
|---|---|---|---|---|
| 309,668 A * | 12/1884 | Weightman | .................. | 119/613 |
| 1,884,018 A * | 10/1932 | Lowder | ....................... | 401/266 |
| 2,250,878 A * | 7/1941 | Quaranti | ....................... | 401/28 |
| 2,516,195 A * | 7/1950 | Finton | ....................... | 401/289 |
| 2,722,701 A * | 11/1955 | Blum et al. | .................. | 401/139 |
| 2,832,086 A * | 4/1958 | Wells | ............................. | 401/1 |
| 3,368,569 A * | 2/1968 | Lawrence | .................. | 132/116 |
| 3,612,706 A * | 10/1971 | Verga | ......................... | 401/190 |
| 3,868,188 A * | 2/1975 | Velardi | ....................... | 401/190 |
| 3,961,635 A * | 6/1976 | Miya | ........................... | 132/113 |
| D244,712 S * | 6/1977 | Houston | .................... | D30/159 |
| 4,047,504 A * | 9/1977 | Borba et al. | ................ | 119/631 |
| 4,557,619 A * | 12/1985 | DeVincentis | ................ | 401/190 |
| 4,673,307 A * | 6/1987 | Prestele et al. | ............. | 401/289 |
| 4,912,782 A * | 4/1990 | Robbins | ......................... | 4/678 |
| 4,922,859 A * | 5/1990 | Durell et al. | ............... | 119/603 |
| 5,007,753 A * | 4/1991 | England, Jr. | ................ | 401/139 |
| 5,169,252 A * | 12/1992 | Chappell | ...................... | 401/46 |
| 5,277,511 A * | 1/1994 | Stockton | ..................... | 401/261 |
| 5,299,876 A * | 4/1994 | Singarella | .................... | 401/139 |
| 5,349,716 A * | 9/1994 | Millar | ......................... | 15/245 |
| 5,638,990 A * | 6/1997 | Kastberg | .................... | 222/106 |
| 5,649,502 A * | 7/1997 | Frank | ......................... | 119/665 |
| 5,690,057 A * | 11/1997 | Curry | ......................... | 119/623 |
| 5,894,959 A * | 4/1999 | Sigurlidason | ............... | 222/192 |
| 5,908,255 A * | 6/1999 | Branch | ....................... | 401/139 |
| 5,988,911 A * | 11/1999 | Browne et al. | ............. | 401/139 |
| 6,035,806 A * | 3/2000 | Lorenzo | ..................... | 119/603 |
| 6,112,367 A * | 9/2000 | Burr et al. | .................... | 15/401 |
| 6,283,656 B1 * | 9/2001 | Jiang | ............................. | 401/1 |
| D463,843 S * | 10/2002 | Howell | ...................... | D23/213 |

(Continued)

*Primary Examiner*—Yvonne R. Abbott
(74) *Attorney, Agent, or Firm*—James W. Miller

(57) ABSTRACT

An animal grooming tool (10, 10', 10") that allows a user to spray an animal with a liquid and squeegee excess water from the animal. Spraying and squeegeeing may be performed substantially simultaneously with one another in one motion, if desired. The grooming tool includes a tubular body (14) having a plurality of liquid outlets (22) located along the length of the tool. The body defines a central passageway (18) for conveying liquid to the outlets. Scrapers (42) for providing the tool with its squeegee capability are located adjacent the liquid outlets. The grooming tool further includes a handle region (54) and a grip (58) adjacent one end of the body. A portion of the body is curved to form a concave region (20) so that the tool better conforms to the curved surfaces typically found on the animals groomed with the tool.

3 Claims, 3 Drawing Sheets

U.S. PATENT DOCUMENTS

| | | | |
|---|---|---|---|
| 6,467,983 B2 * | 10/2002 | Fodrocy et al. | 401/279 |
| 6,474,896 B1 * | 11/2002 | DeLaine, Jr. | 401/289 |
| 6,547,469 B2 * | 4/2003 | Vito | 401/138 |
| 6,553,941 B2 * | 4/2003 | Porter | 119/665 |
| 7,044,137 B2 * | 5/2006 | Glucksman et al. | 132/114 |

* cited by examiner

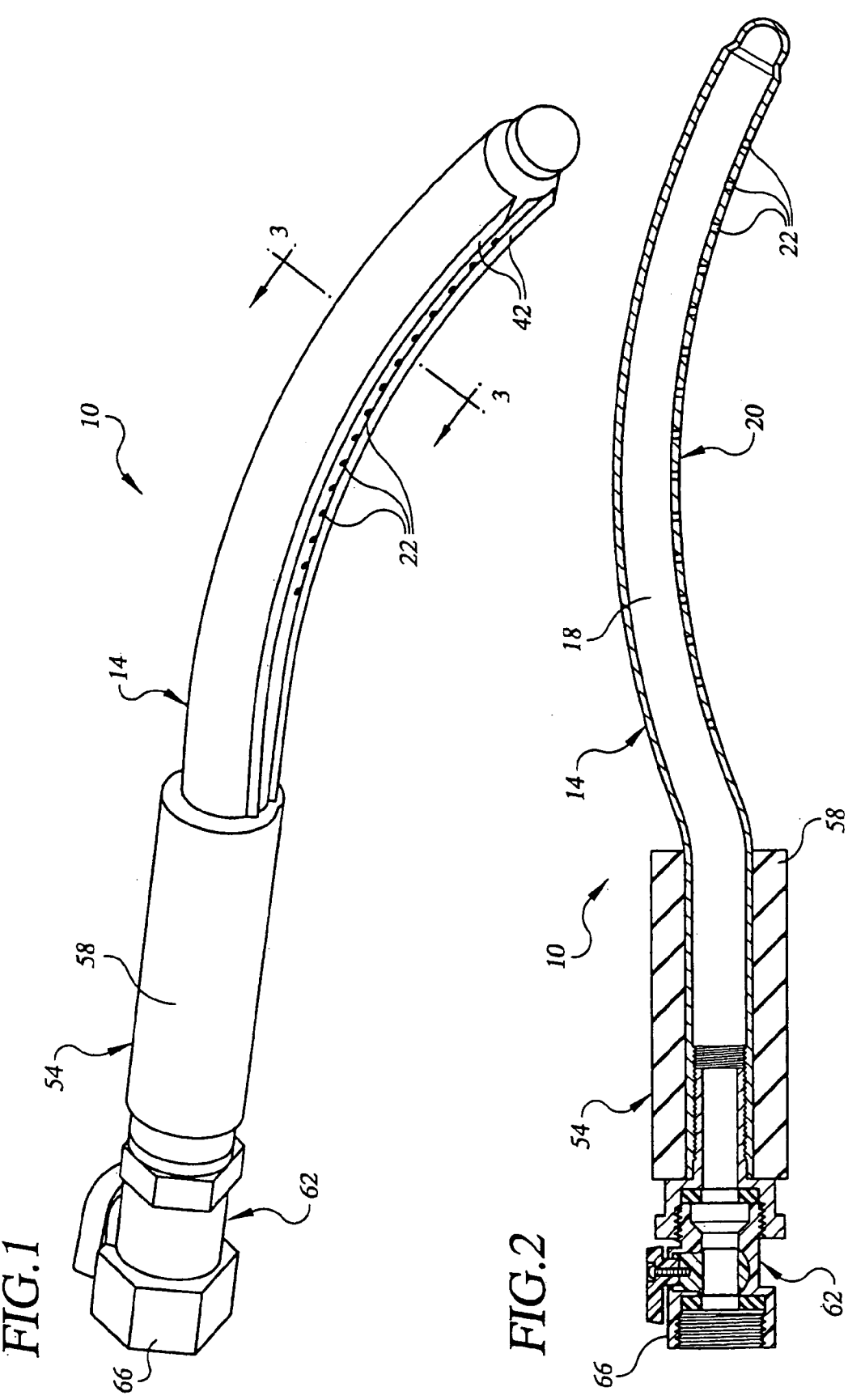

ANIMAL GROOMING TOOL

CROSS-REFERENCE TO RELATED APPLICATION

This application claims the benefit of priority of, and incorporates herein in its entirety, U.S. Provisional Patent Application Ser. No. 60/384,799 filed May 30, 2002, and entitled "Wash Wand."

FIELD OF THE INVENTION

The present invention relates generally to the field of animal husbandry. More particularly, the present invention is directed to an animal grooming tool.

BACKGROUND

The care and grooming of domesticated animals can be a difficult, dirty and time-consuming task. For example, washing and grooming a large animal such as a horse can take an hour or more using conventional methods utilizing an ordinary garden-type hose, soap, brush and, perhaps, a squeegee. A horse is but one example of an animal that requires cleaning from time to time. Other examples include dogs and farm animals that are shown at state fairs, local farm shows and the like wherein the animals must be clean and well groomed. Such show animals are often relatively large animals, such as bovine, goats, sheep and pigs, among others. Accordingly, it is often desirable to clean and groom relatively large animals on a routine basis to maintain the well being of the animals and/or prepare the animals for showing and, depending on where the animals are kept, maintain the well being of their caretakers and others.

SUMMARY OF THE INVENTION

In one aspect, the present invention is directed to a tool for spraying a liquid. The tool comprises an elongate body having a first end, a second end and a length extending between the first and second ends. A plurality of liquid outlets is located on the elongate body and positioned along the length. Each of the plurality of liquid outlets is configured for emitting the liquid. At least one scraper is attached to the body and extends in a direction substantially along the length. In another aspect, the present invention is directed to a tool for spraying a liquid. The tool comprises an elongate body having a first end, a second end and a length extending between the first and second ends. The elongate body includes an elongate concavely curved region extending from proximate the first end to proximate the second end along the length. A plurality of liquid outlets are located in the concavely curved region and are positioned along the length. The plurality of liquid outlets are configured for emitting the liquid from the tool.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 1 is a perspective view of a grooming tool of the present invention;

FIG. 2 is a longitudinal cross-sectional view of the grooming tool of FIG. 1;

DETAILED DESCRIPTION OF THE DRAWINGS

Figure 3:
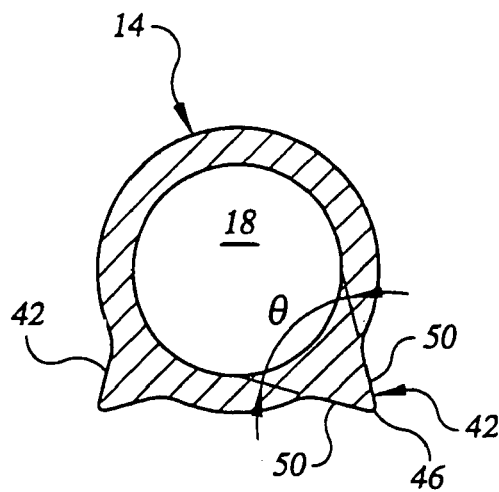
FIG. 3 is an enlarged cross-sectional view of the grooming tool as taken along line 3—3 of FIG. 1.

Referring now to the drawings, wherein like numerals indicate like elements, FIGS. 1–3 show in accordance with the present invention a grooming tool, which is denoted generally by the numeral 10. A user may use grooming tool (10) to wash an animal (not shown) by allowing the user to spray a liquid, such as water, water/shampoo solution or water/conditioner solution, onto the animal to rinse, wash, and/or apply a conditioner to the animal. Grooming tool 10 may be provided with other features that allow the user to shed the liquid and any dirt present from the animal and/or further groom the animal. Liquid and/or dirt may be gently shed from the coat using grooming tool 10 to lightly scrape, or squeegee, the coat by moving the tool in the growth direction of the coat hair, if any. If desired, the user can use grooming tool 10 to spray the liquid and squeegee the animal's coat substantially simultaneously with one another to force water, loose hair, dirt, and other foreign material from the coat in one motion.

Grooming tool 10 may be adapted for use with animals of various sizes. For example, in one configuration, grooming tool 10 may be sized and/or shaped for grooming dogs, sheep, goats, swine or other similarly sized animals. In another configuration, grooming tool 10 may be sized and/or shaped for grooming larger animals, such as horses, cattle and other similarly sized livestock. Those skilled in the art will appreciate that the various features of the present invention described below may be incorporated into any tool wherein a spraying feature and a scraping feature are desirable alone or in combination with one another.

Grooming tool 10 may include a generally elongated body 14 defining a central passageway 18 for receiving water, water/soap solution or other liquid supplied to the tool from a liquid source (not shown), such as a hose or the like. A portion of body 14 may be curved to define a concave region 20 in order to better conform tool 10 to the typically curved surfaces of animals that the tool is designed to engage. Those skilled in the art will readily appreciate that if concave region 20 is provided, the type and extent of its curvature may be any suitable for the size and/or type of animal(s) for which tool 10 is designed. For example, if tool 10 is configured for use with horses, concave region 20 may define an arc of a circle having a radius of, e.g., 18 inches to 30 inches (46 cm to 76 cm) and an included angle of, e.g., 20° to 30°. As those skilled in the art will readily appreciate, these radii and included angles are merely exemplary and may be other values determined based upon design conditions and other factors. As a further example, concave region 20 of grooming tool 10 configured for medium size dogs may define an arc of a circle having a radius of, e.g., 8 inches to 14 inches (20 cm to 36 cm) and an included angle of, e.g., 35° to 45°. Again, those skilled in the art will appreciate that these radii and included angles are merely illustrative.

Tool 10 may be made of any suitable material desired, such as metal, e.g., aluminum, among others, or plastic, e.g., polyvinyl chloride (PVC), among others. In one configuration, the liquid source may be a conventional garden-type hose. Body 14 may include a plurality of liquid outlets 22 disposed along its length. Outlets 22 may simply be the aperture-type outlets shown or may be more elaborate devices, such as nozzles, e.g., nozzles 26 of FIG. 7. If nozzles are used, each nozzle may be adjustable with respect to spraying direction, spray pattern, e.g., flat, circular, dispersed, and jet, among others, and/or flow rate. Those skilled in the art will appreciate the variety of nozzles that may be provided.

Outlets 22 may be configured so that the noise caused by a liquid flowing therethrough is minimized. In particular, it is sometimes desirable to eliminate the "hissing" noise commonly experienced with conventional spray nozzles. This can be important because many large animals instinctively associate such a hissing noise with snakes and other threatening animals. Eliminating this hissing noise reduces the chance of an animal being groomed with a grooming tool being startled and posing a risk to themselves and/or the groomer or others in close proximity to the animal during grooming.

Figure 4A:
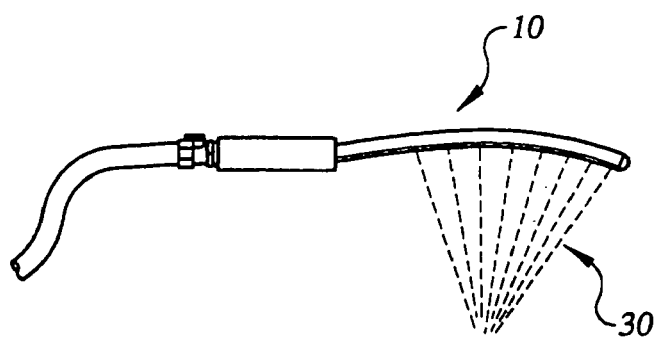
FIGS. 4A–4C illustrate several spray patterns that may be achieved with a grooming tool of the present invention.
Figure 4B:
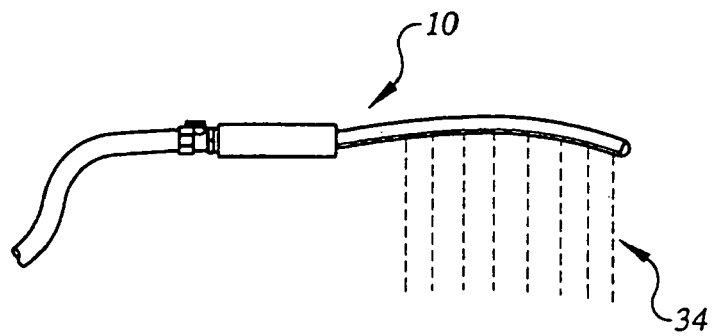
Figure 4C:
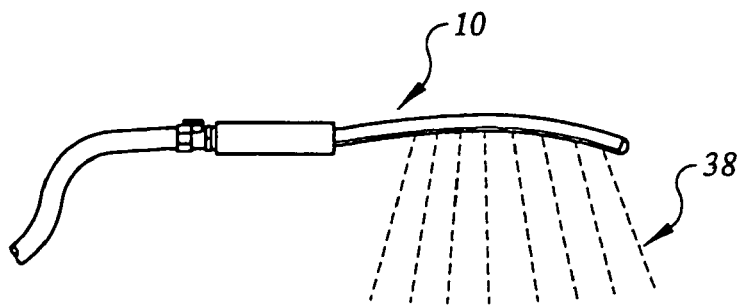

Outlets 22 may be arranged in any suitable arrangement, such as a single row or multiple staggered or non-staggered rows, among others. Outlets 22 may be configured to direct liquid out of central passageway 18 so as to form a converging pattern 30 (FIG. 4A). Of course, outlets 22 may be configured to direct water in a non-converging pattern, e.g., a parallel pattern 34 (FIG. 4B) or a diverging pattern 38 (FIG. 4C), among others. Those skilled in the art will understand the variety of spray patterns possible and how to implement the spray pattern(s) chosen for a particular configuration of tool 10.

Referring again to FIGS. 1–3, grooming tool 10 may include one or more scrapers 42 extending along elongated body 14, e.g., adjacent the one or more rows of outlets 22. Each scraper 42 generally allows a user to squeegee water, shampoo, other liquid and/or dirt from an animal during the grooming process. For example, if at least one scraper 42 is positioned adjacent outlets 22, the user may use both the spray feature and squeegee feature at substantially the same time. That is, the user may move grooming tool 10 along the animal's body with the one of scrapers 42 on the trailing side of outlets 22 contacting the animal and the tool oriented so that it sprays water generally toward the animal and in the direction the user is moving the tool. Alternatively, the user may use the squeegee feature independently of the wash feature, e.g., after the user has washed or rinsed the animal using the spray feature and/or other tools. In this case, the user would typically spray the liquid while holding tool 10 spaced from the animal's body.

Each scraper 42 may have any suitable cross-sectional shape, such as the generally triangular shape shown in FIG. 3, so long as it provides the requisite squeegee function. Generally, however, each scraper 42 will typically have a contact edge 46 defined by two surfaces 50 that form an angle $\theta$ of 90° or less. Scrapers 42 may be made of the same material as body 14 and may be formed integrally with the body or, alternatively, may be formed separately from the body and attached thereto in any suitable manner, such as welding, bonding, or mechanical fastening or interference fit, among others. For example, each scraper 42 may be attached to body 14 by engaging the suitably shaped scraper with a corresponding like-shaped channel (not shown) formed on the body. Scraper(s) 42 may alternatively be made of a material different than the material of body 14. For example, body 14 may be made of aluminum and scrapers 42 of rubber. Those skilled in the art will understand the variety of configurations of body 14 and scraper(s) 42 and the ways the scraper(s) may be attached to the body, such that exhaustive lists need not be provided herein for those skilled in the art to appreciate the broad scope of the present invention.

Figure 6:
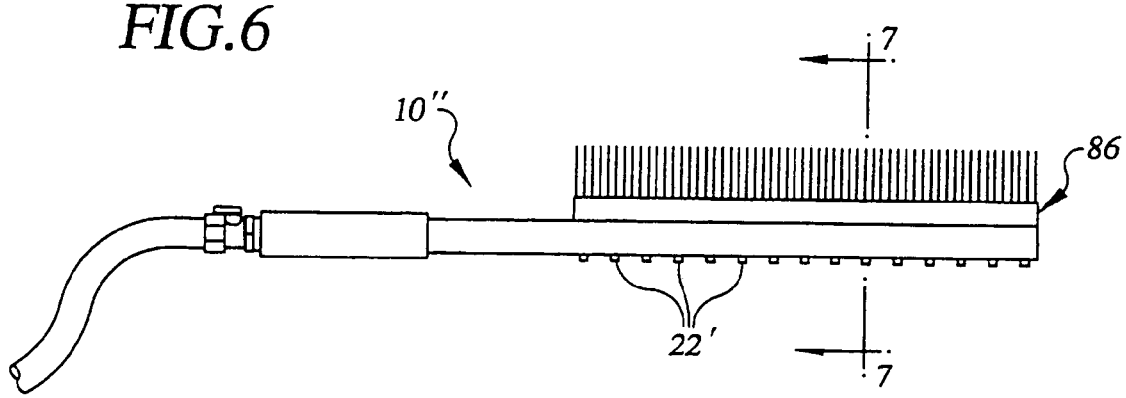
FIG. 6 is an elevational view of an alternative embodiment of a grooming tool of the present invention.
Figure 7:
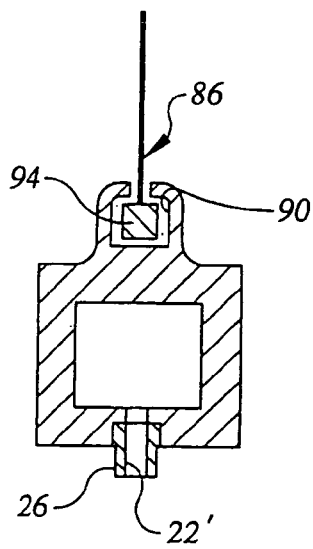
FIG. 7 is a cross-sectional view of the alternative embodiment of the grooming tool as taken along lines 7—7 of FIG. 6.

In general, body 14 may have any cross-sectional shape desired, such as rectangular, triangular, circular or oval, among others. If body 14 has a rectangular, triangular, or similar cross-sectional shape, one or more of the longitudinal edges formed by these shapes may provide the one or more scrapers. (FIGS. 6 and 7 show this in connection with a square cross-sectional shape.) Alternatively, one or more suitable scrapers 42, such as scrapers having a polygonal cross-sectional shape may be provided in addition to the longitudinal edges of body 14.

Body 14 may also include a handle region 54 adjacent at one end of the body that allows a user to maintain a firm grip on grooming tool 10. Handle region 54 may be part of body 14 or may be part of another member (not shown) attached to the body. Handle region 54 may include a grip 58 made of, e.g., a suitable non-slip material, such as open cell foam rubber, among others. Tool 10 may also be provided with a valve 62 for turning the flow of liquid to liquid outlets 22 off and on and/or otherwise regulating the flow of liquid emitted from the outlets. Valve 62 may also be adjustable to allow the user to control the sound, e.g., hissing sound, emitted from tool 10 for the reasons discussed above. Tool 10 may further include a fitting 66, e.g., a quick-connect or threaded fitting, among others, for attaching the tool to a water source, such as a hose, e.g., a garden-type hose.

Figure 5:
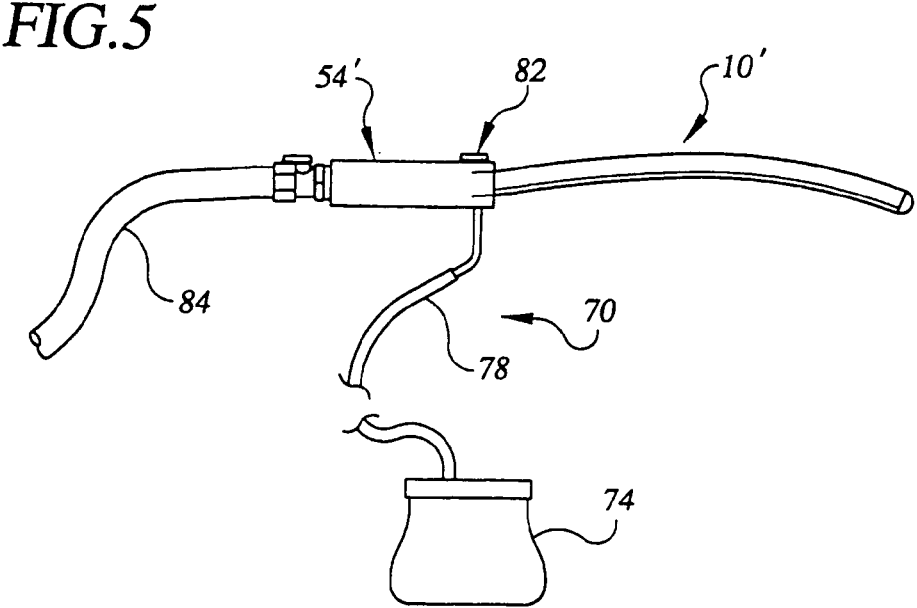
FIG. 5 is a schematic of a grooming system of the present invention that includes a soap-dispensing feature.

FIG. 5 shows another embodiment of a grooming tool 10' of the present invention that may be used in conjunction with a shampoo and/or conditioner dispensing system 70. Dispensing system 70 may include a reservoir 74 for storing a liquid shampoo or conditioner and a hose or other conduit 78 for carrying the shampoo or conditioner to grooming tool 10'. Alternatively, reservoir 74 may be fixedly attached to grooming tool 10'. Although a liquid dispensing system 70 is shown, those skilled in the art will appreciate that in alternative embodiments, shampoo or conditioner may be in another form, such as powder.

Grooming tool 10' may include a mixing device, e.g., a venturi mixer 82, for mixing shampoo or conditioner with water supplied to the tool via a hose or other liquid conduit 84. If a venturi mixer is used, the mixing function may be controlled using a vacuum inlet (not shown) in fluid communication with the venturi mixer. The vacuum inlet may be provided in handle region 54' so that it is readily accessible to a user. To cause shampoo/conditioner to be drawn into mixer 82, the user would cover the vacuum inlet, e.g., with his/her thumb, thereby causing a suction force within conduit 78 that draws the shampoo into the mixer. To stop shampoo/conditioner from being drawn into mixer 82, the user would uncover the vacuum inlet thereby causing air to be drawn into the mixer through the vacuum inlet rather than the shampoo/conditioner being drawn into the mixer. In alternative embodiments, the shampoo/conditioner need not be mixed with water, but may be applied using a separate dispensing system (not shown) that operates in parallel with the water spraying system. Those skilled in the art will understand the many variations of dispensing systems 70 that may be used with grooming tool 10'.

FIGS. 6 and 7 show another grooming tool 10" of the present invention. Grooming tool 10" may fitted with a grooming attachment 86, such as a comb or brush. Grooming attachment 86 may be permanently or removably mounted to grooming tool 10″, e.g., on the backside of the tool, i.e., the side of the tool opposite liquid outlets 22′. In the embodiment shown, grooming tool 10″ may include a longitudinal channel 90 for receiving therein a spline 94 of grooming attachment 86.

While the present invention has been described in connection with preferred embodiments, it will be understood that it is not so limited. On the contrary, it is intended to cover all alternatives, modifications and equivalents as may be included within the spirit and scope of the invention as defined above and in the claims appended hereto.

What is claimed is:

1. A tool for spraying a liquid, comprising:
   a) an elongate body having a first end, a second end, a length extending between said first and second ends, and a handle region proximate said first end;
   b) a plurality of liquid outlets located at least on one side of said elongate body and positioned along said length, each of said plurality of liquid outlets configured for emitting the liquid;
   c) at least one scraper attached to said body and extending in a direction substantially along said length, wherein said scraper has an elongated free edge that lies in a first vertical reference plane when said body is substantially horizontal with the liquid outlets facing generally vertically downwardly;
   d) wherein the liquid outlets are configured and located on said body so as to emit liquid in a plurality of streams that lie in a second vertical reference plane when said body is substantially horizontal with the liquid outlets facing generally vertically downwardly, and wherein the second plane in which the liquid streams are emitted is both parallel to and horizontally offset to one side of the first plane which contains the free edge of the scraper such that the free edge of the scraper is horizontally offset on said body from the liquid outlets when said body is substantially horizontal with the liquid outlets facing generally vertically downwardly; and
   e) wherein the free edge of the scraper is positioned on said body to be at least substantially as low as the liquid outlets when said body is substantially horizontal with the liquid outlets facing generally vertically downwardly.

2. A tool according to claim 1, wherein said at least one scraper is formed integrally with said elongate body.

3. A tool according to claim 1, further including a fitting carried on the handle region for connecting said elongate body to a water hose.

* * * * *